Oct. 24, 1950

S. R. GARNER 2,527,212

BATTERY TERMINAL CLAMP

Filed Nov. 29, 1946

INVENTOR.
SAMUEL R. GARNER
BY
Bosworth & Sessions
ATTORNEYS.

Patented Oct. 24, 1950

2,527,212

UNITED STATES PATENT OFFICE 2,527,212

BATTERY TERMINAL CLAMP

Samuel R. Garner, Cleveland, Ohio

Application November 29, 1946, Serial No. 712,764

2 Claims. (Cl. 173—259)

This invention relates to terminal clamps for electric storage batteries or the like and more particularly to an improved terminal clamp formed from sheet or strip metal and including cable attaching means whereby the end of a cable or conductor may be attached to the terminal clamp either temporarily or permanently.

The conductor cables employed to provide electrical connections between a storage battery or the like and the electrical apparatus supplied by the battery are usually connected to the battery terminals by means of clamps secured to the ends of the cables and adapted to be removably secured to the battery terminals. Terminal clamps commonly used prior to my invention have been made by casting. This produces a relatively heavy article and one which has relatively little resiliency or spring as compared to that which can be obtained from rolled metal in sheet or strip form. Furthermore, the prior terminal clamps with which I am familiar have either been connected to the cable end by soldering or by a removable clamp device. So far as I am aware none of the prior terminal clamps have been adapted to be attached to the cable either temporarily by clamping or permanently by soldering or other means, at the option of the user.

It is therefore among the objects of my invention to provide a battery terminal clamp which is adapted to be formed entirely by stamping or bending operations from sheet metal stock and which may be either temporarily or permanently attached to a cable. Other objects of my invention include: the provision of a terminal clamp made by stamping operations from sheet metal and on which no machining operations are necessary; the provision of a terminal clamp which can be attached to battery terminals of varying diameters and of either cylindrical or tapered form; the provision in a terminal clamp of means for securing the clamp to a cable which permits use of cables of either round or flat cross-section; the provision of a terminal clamp made of sheet metal which is light in weight and requires a minimum of material but which has great rigidity where such is necessary and will provide an extremely tight grip on a battery terminal; and the provision of a battery terminal and cable clamp which is of attractive design, may be economically manufactured, and is adapted for use with a wide range of battery terminal sizes and cable types and forms.

The above and other objects of my invention will appear from the following description of a preferred embodiment thereof reference being had to the accompanying drawings in which.

Figure 1:
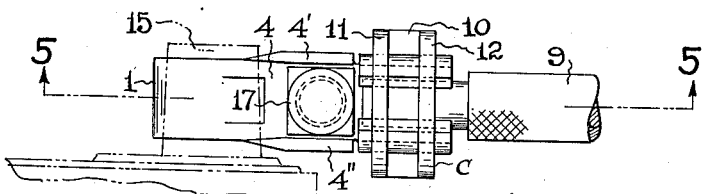
Figure 1 is a side elevation of my improved terminal clamp attached by my quick acting or temporary attaching means to a cable of round cross-section, a battery terminal being illustrated in phantom lines.

Generally speaking my invention contemplates a stamped sheet metal battery terminal clamp having a generally cylindrical split sleeve or loop terminal engaging portion, stiffening and terminal gripping bosses extending inwardly from the inner surface of the sleeve, arms extending from the split ends of the sleeve, means integral with one of these arms for securing the clamp to a conductor cable, and screw means for drawing the arms together to clamp the sleeve around the battery terminal.

Referring now to the drawings, it will be seen that my terminal clamp is made by stamping and/or bending operation from sheet metal and is of substantially uniform thickness throughout all parts of the body of the clamp. The terminal gripping sleeve is generally indicated at 1. A clamping arm 2 extends outwardly from end of the sleeve 1 adjacent the split or gap 3 between the ends of the sleeve 1. A coacting arm 4 extends in similar manner from the opposite side of the split 3. The outer end 4ª of arm 4 is formed with inwardly bent opposed tangs 5 and 6 which, together with the end 4ª, provide a generally triangular aperture 7 for receiving the stripped end 8 of the conductor cable 9.

Figure 4:
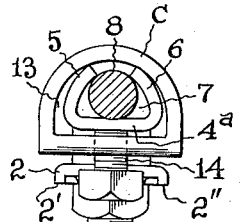
Figure 4 is an end view taken substantially on line 4—4 of Figure 2.
Figure 3:
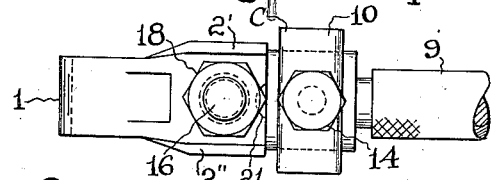
Figure 3 is a side elevation generally similar to Figure 1 but taken from the opposite side of the device.
Figure 5:
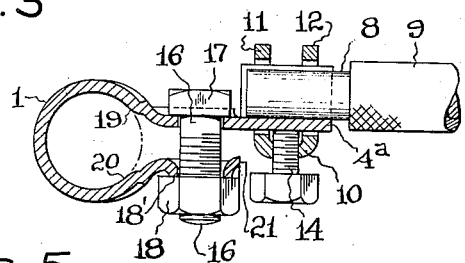
Figure 5 is a horizontal cross-sectional view taken on line 5—5 of Figure 1.
Figure 6:
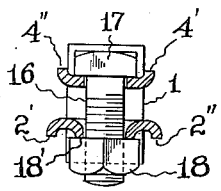
Figure 6 is a vertical cross-sectional view taken on line 6—6 of Figure 2.

Figures 1 to 5 inclusive show my clamp secured to a cable, having a circular conductor portion 8, by means of my quick acting gripping mechanism which is particularly adapted for emergency repair work or temporary connections when a soldered joint is not desired or when facilities are not available for more permanently attaching the clamp to the cable. My quick acting cable clamp comprises a generally U-shaped clamp member C having a flat base 10 and spaced flanges 11 and 12. Generally half round openings 13 (see Figure 4) are formed in the flanges 11 and 12 so that the clamp C may fit over the end 4ᵃ of the arm 4 when a cable 8 is disposed in the opening 7. A clamp screw 14 is threaded through the base 10 and, as is best illustrated in Figures 4 and 5, when the screw 14 is tightened so that its inner end engages the inner side of the arm 4, the flanges or yokes 11 and 12 will be drawn down against the ends of the tangs 5 and 6 which in turn will be bent inwardly to grip the end 8 of the cable and make satisfactory physical and electrical connections between the terminal clamp and the cable.

Figure 2:
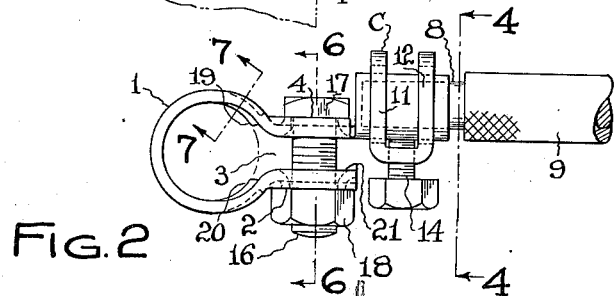
Figure 2 is a top plan view of the device shown in Figure 1.

To clamp the sleeve 1 on the battery terminal 15, I provide a bolt 16 which extends freely through oppositely aligned holes in the arms 2 and 4 and has a square head 17 disposed in non-rotatable relation between outwardly projecting flanges 4' and 4'' on the arm 4. These flanges 4' and 4'', and the corresponding flanges 2' and 2'' on arm 2 merge into the edges of sleeve 1 as best seen in Figure 2, thus assisting in preventing inward bending of the arms without corresponding contraction of sleeve 1. The clamp nut 18 is adapted to be tightened down upon the outwardly extending boss 18' formed in the arm 2. As the square head 17 of the bolt 16 is restricted from turning by the flanges 4' and 4'', it is unnecessary to hold the head 17 while tightening or loosening the nut 18.

When the nut 18 is tightened the arms 2 and 4 will be drawn together and the sleeve 1 will be contracted to grip tightly around the battery terminal 15. An important feature of my invention, which enables me to make my clamp from relatively thin sheet metal and which provides the necessary rigidity and stiffness to the parts of the sleeve 1 which are subjected to the greatest stress when the clamp is applied, is the opposed inwardly projecting tapering lugs or bosses 19 and 20. These bosses extend circumferentially of and are formed on opposite sides of the sleeve 1 adjacent the open ends thereof. They merge gradually into the main body of the sleeve 1 and are substantially non-resilient relative thereto as they are integrally connected to the sleeve body at all points around their edges. This is clearly shown in Figures 2 and 5, and it will also be noted that bosses 19 and 20 have their maximum inward projection adjacent the open ends of the sleeve. Furthermore, the vertical height of the bosses 19 and 20 is less than the height of the sleeve 1 and they are preferably located with the top and bottom edges of the bosses spaced inwardly from the top and bottom edges of the sleeve.

Figure 7:
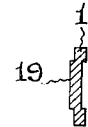
Figure 7 is a fragmentary cross-sectional view taken on line 7—7 of Figure 2 and illustrating my terminal gripping lugs or bosses.

A channel shaped cross-section, as seen in Figure 7, is provided for the inner end portions of sleeve 1 by means of the embossed or inwardly struck bosses 19 and 20. When the clamp is in position on a battery terminal 15 the outer or left hand portion of the sleeve 1 (as seen in Figures 1, 2 and 5) together with the inner faces of the bosses 19 and 20 firmly grip the terminal and assume the shape of the terminal. The arms 2 and 4 are reinforced and stiffened by flanges 2', 2'' and 4', 4'' respectively and the open ends of the sleeve 1 are stiffened or reinforced by the bosses 19 and 20. Thus, although my terminal clamp may be made from relatively thin gauge stock and is of substantially uniform thickness throughout, a very rigid structure is provided and the clamping nut 18 may be tightened sufficiently to give an extremely firm grip of the sleeve 1 upon the battery terminal 15.

At the outer end of arm 2 I preferably provide an inwardly extending boss or lug 21. When my terminal clamp is applied to a battery terminal of relatively small diameter it may be necessary to contract the sleeve 1 by tightening the nut 18 until the arms 2 and 4 are almost in engagement. In such cases, lug 21 will engage the inner side of arm 4 first and the final tightening or drawing together of the open ends of sleeve 1 will be facilitated by the leverage offered by this engagement of the lug 21 with the arm 4.

Figure 8:
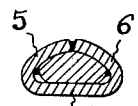
Figure 8 is a fragmentary vertical cross-sectional view through the cable attaching end of my device and showing the cable gripping tangs as they appear when bent inwardly to grip the end of a round cable.
Figure 9:
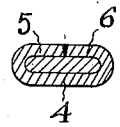
Figure 9 is a view similar to Figure 8 but illustrating how my cable clamping means is adapted to grip a flat cable.

As has been previously explained, my terminal clamp is adapted either for quick and more or less temporary attachment to a cable by means of the clamp C or for permanent attachment by crimping and/or soldering. In Figure 8 I have illustrated the tangs 5 and 6 as they appear after having been hammered or otherwise bent inwardly onto a round cable, the cable being somewhat distorted and the tangs 5 and 6 together with the end 4ᵃ of arm 4 firmly gripping the cable end. A similar arrangement is illustrated in Figure 5 which shows the tangs 5 and 6 folded inwardly upon a cable of the flat type. It will be understood by those skilled in the art that the joint between the clamp and the cable end may also advantageously be soldered after the cable has been gripped by the tangs 5 and 6. I have found that for use with ordinary storage batteries of the automotive type my terminal clamp may be formed from rolled sheet brass approximately $\frac{3}{32}$ inch in thickness. Finished clamps are preferably coated with lead to form a protective covering.

Although I have described the illustrated embodiment of my invention in considerable detail it will be understood by those skilled in the art that variations and modifications may be made in the form and proportions of my device. I do not, therefore, wish to be limited to the particular arrangement herein shown and described but claim as my invention all embodiments thereof coming within the scope of the appended claims.

I claim:

1. In a stamped sheet metal battery terminal clamp, a split terminal engaging sleeve having non-resilient stiffening and gripping bosses adjacent its split ends, clamping arms extending outwardly from the split ends of said sleeve, one of said arms extending beyond the other, said gripping bosses extending circumferentially of said sleeve away from said split ends and the radial inward projection of said bosses from the inner wall of said sleeve tapering from a maximum adjacent the split ends of said sleeve to a smooth merger with the inner surface of said sleeve.

2. In a stamped sheet metal battery terminal clamp, a split terminal engaging sleeve having non-resilient stiffening and gripping bosses adjacent its split ends, clamping arms extending outwardly from the split ends of said sleeve, one of said arms extending beyond the other, said gripping bosses extending circumferentially of said sleeve away from said split ends and the radial inward projection of said bosses from the inner wall of said sleeve tapering from a maximum adjacent the split ends of said sleeve to a smooth merger with the inner surface of said sleeve, the thickness of said sleeve and said bosses being substantially the same.

SAMUEL R. GARNER.

REFERENCES CITED

The following references are of record in the file of this patent:

UNITED STATES PATENTS

| Number | Name | Date |
|---|---|---|
| 899,636 | Vibber | Sept. 29, 1908 |
| 1,036,143 | Phillips | Aug. 20, 1912 |
| 1,487,617 | Stoppenbach | Mar. 18, 1924 |
| 1,520,868 | Hutton | Dec. 30, 1924 |
| 1,920,548 | Carlson | Aug. 1, 1933 |
| 2,074,898 | Fotsch | Mar. 23, 1937 |
| 2,114,014 | Church | Apr. 12, 1938 |
| 2,152,832 | Winchester | Apr. 4, 1939 |